(12) United States Patent
Komine

(10) Patent No.: US 6,842,570 B2
(45) Date of Patent: Jan. 11, 2005

(54) METHOD FOR COUPLING DIODE ARRAY LIGHT INTO AN OPTICAL FIBER

(75) Inventor: Hiroshi Komine, Torrance, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 65 days.

(21) Appl. No.: 10/317,398

(22) Filed: Dec. 11, 2002

(65) Prior Publication Data
US 2004/0114858 A1 Jun. 17, 2004

(51) Int. Cl.[7] .............. G02B 6/26; G02B 6/34; H04B 10/12
(52) U.S. Cl. .............. 385/43; 385/31; 385/37; 359/341.1
(58) Field of Search ............ 359/341.1–341.5; 385/14, 15, 24, 31, 37, 43

(56) References Cited

U.S. PATENT DOCUMENTS

| | | | | |
|---|---|---|---|---|
| 5,091,915 A | * | 2/1992 | Tatsumi et al. | 372/75 |
| 5,170,458 A | * | 12/1992 | Aoyagi et al. | 385/127 |
| 5,999,673 A | | 12/1999 | Valentin et al. | |
| 6,229,939 B1 | | 5/2001 | Komine | |
| 6,243,515 B1 | | 6/2001 | Heflinger et al. | |
| 6,490,388 B1 | * | 12/2002 | Manzur | 385/27 |
| 6,608,951 B1 | * | 8/2003 | Goldberg et al. | 385/43 |
| 6,731,837 B2 | * | 5/2004 | Goldberg et al. | 385/27 |
| 2002/0094159 A1 | | 7/2002 | Goldberg et al. | |
| 2002/0172486 A1 | * | 11/2002 | Fermann | 385/128 |

* cited by examiner

*Primary Examiner*—Akm Enayet Ullah
*Assistant Examiner*—Michelle R. Connelly-Cushwa
(74) *Attorney, Agent, or Firm*—John A. Miller; Warn, Hoffmann, Miller & LaLone, P.C.

(57) ABSTRACT

An optical system (10) that couples pump light (30) into a signal fiber (12) of a fiber array laser/amplifier. The system (10) includes a tapered light guide (TLG) (24) optically coupled to the signal fiber (12) so that the signal light propagates into a single-mode core (48) extending through the TLG (24). The TLG (24) includes a diffraction grating aperture (34) through which the pump light (30) is coupled into the TLG (24). An array of diode emitters (28) is positioned adjacent to the diffraction grating aperture (34) so that the pump light (30) is diffracted into the TLG (24). The pump light (30) is reflected off of the interface (40) between the TLG (24) and air. The angle of the pump light (30) as it is reflected off of an interface (40) between the TLG (24) and air decreases so that the pump light (30) is contained within the signal fiber (12).

29 Claims, 5 Drawing Sheets

METHOD FOR COUPLING DIODE ARRAY LIGHT INTO AN OPTICAL FIBER

BACKGROUND OF THE INVENTION

1. Field of the Invention

This invention relates generally to an optical system for coupling pump light into a signal fiber of a fiber array laser/amplifier and, more particularly, to an optical system including a tapered light guide through which pump light is coupled into a signal fiber of a high power, dual-clad fiber array laser/amplifier.

2. Discussion of the Related Art

High power lasers are employed for many applications, such as military applications against a variety of airborne threats, including ballistic missiles, cruise missiles and tactical aircraft. A diode-pumped, solid-state laser amplifier employing an array of fibers is one known high power laser used for these types of applications. U.S. Pat. No. 6,229,939, titled High Power Fiber Ribbon Laser and Amplifier, assigned to the assignee of this invention, and herein incorporated by reference, discloses such a high power fiber array laser amplifier.

A typical high power fiber array laser includes an array of spaced apart single-mode fibers each generating a separate laser beam that are combined into a single beam to provide the high power output. Fiber array lasers of this type may include a hundred or more single-mode fibers each generating about a hundred watts of power. Each fiber in the array typically includes a round single-mode core having a diameter on the order of 5–20 $\mu$m to generate the laser beam. An inner cladding layer formed around the core and having a lower index of refraction than the core traps the single-mode beam within the core. An outer cladding layer having a lower index of refraction than the inner cladding layer contains pump light within the fiber and directs it across the core to be absorbed therein and amplify the beam by a physical process well understood to those skilled in the art.

A single-mode laser beam generates the most power per unit area when the beam is focused. As the number of transverse modes of the laser beam increases, the size of the beam spot that can be focused also increases as a result beam diffraction. This reduces the beam power per unit area, which reduces its intensity.

The power output of a fiber laser can be increased by increasing the length of the core of the fibers and providing more optical pump light. However, the material of the core has power limits that if exceeded may damage the core material. Multiple single-mode fibers are thus required to generate the desired total beam output power. More optical power can also be provided by making the core diameter larger. However, as the core diameter increases, the generation of higher-order propagation modes begin to develop, and it becomes increasingly more difficult to limit the beam to a single-mode. Further, as the size of the core and the power increases, the generation of heat in the core also increases. Cooling systems can be employed to reduce the heat, but larger diameter cores make it more difficult to remove the heat from the center of the core. Therefore, a heat gradient may exist across the array, which causes a decrease in performance of the laser.

It is necessary to couple the proper amount of pump light into the signal fibers in the fiber array to amplify the signal and provide the desired beam power. Various techniques are known in the art to couple the pump light into the signal fibers. In one particular design, a diode emitter is coupled to one end of a pump light guide fiber and the opposite end of the guide fiber is butt coupled to an end of the signal fiber so that pump light from the diode emitter is coupled into the signal fiber. Because the diode emitter only generates a minimal amount of pump light, additional pump light needs to be coupled into the signal fiber to meet the power requirements of the fiber. Therefore, many pump light guide fibers, each being coupled to a separate diode emitter, are fused together and butt coupled to the end of each signal fiber in the array so that the light of many diode emitters is coupled into the signal fiber.

For example, a typical diode emitter may generate 1–2 watts of power. A typical single-mode fiber can handle more than 100 watts of power. Therefore, about 50–100 separate emitter diodes need to be provided for each signal fiber in the array, which may include up to 100 signal fibers. In some designs, it is not possible to couple that many emitters to each fiber, and thus power is sacrificed. Further, the emitter's brightness limits the fraction of the power that can be coupled into a fiber array of a fiber laser/amplifier. Because so many diode emitters are required for the entire fiber array, current commercial pump light sources are very expensive, for example, $40,000 for a 250 W unit U.S. Pat. No. 6,243,515, titled Apparatus for Optically Pumping an Optical Fiber from the Side, issued Jun. 5, 2001 to Hefflinger, et al., describes an apparatus for optically pumping an optical signal fiber from the side. Diode pump light is first collimated by a lens, and then coupled transversely into a signal fiber using a reflective diffraction grating formed along a short section of the signal fiber. The diffracted pump light travels in the signal fiber and is contained therein by total internal reflection (TIR). The technique disclosed in the '515 patent for coupling pump light into a fiber requires a lens for each diode emitter. Further, additional diode emitters can only be positioned adjacent to each other at sufficiently long intervals to ensure efficient pump light absorption and to prevent deleterious light leakage at the next input location.

SUMMARY OF THE INVENTION

In accordance with the teachings of the present invention, an optical pump light system is disclosed that efficiently couples pump light into a signal fiber of a fiber array laser/amplifier at relatively low cost. The optical system includes a tapered light guide optically coupled to each signal fiber in the fiber array. A single-mode core through which the signal light propagates extends through the tapered light guide and is coupled to a core of the signal fiber. The tapered light guide includes a diffraction grating aperture through which the optical pump light is coupled into the light guide. An array of diode emitters is positioned adjacent to the diffraction grating aperture so that pump light emitted therefrom is diffracted through the diffraction aperture and into the tapered light guide.

The optical pump light is reflected off of the interface between the light guide and air repeatedly by total internal reflection so that the pump light is contained therein. The taper of the light guide is such that the diameter of the light guide increases from the diode array to the signal fiber. The degree of the taper is selected so that as the pump light is repeatedly reflected off of the interface, the angle relative to the axis of the light guide decreases as the pump light propagates towards the signal fiber. Once the pump light reaches the signal fiber, the angle of incidence of the pump light matches the numerical aperture (NA) of the signal fiber.

The many diode emitters provide enough pump light power coupled into the signal fiber for high power applications.

In one embodiment, the grating can be of a type that causes the pump light to be diffracted in both directions into the light guide, where the light guide tapering expands in both directions. Thus, pump light can be directed along a greater length of the single-mode core of the signal fiber. In this embodiment, both ends of the tapered light guide are coupled to a signal fiber. The optical pump light system can be coupled to the signal fiber to provide end pumping, or can be distributed along the signal fiber of a fiber amplifier.

Additional features and advantages of the present invention will become apparent from the following description and appended claims, taken in conjunction with the accompanying drawings.

DETAILED DESCRIPTION OF THE EMBODIMENTS

The following discussion of the embodiments of the invention directed to an optical pump light system employing a tapered light guide for a fiber array laser/amplifier is merely exemplary in nature, and is in no way intended to limit the invention or its applications or uses.

Figure 1:
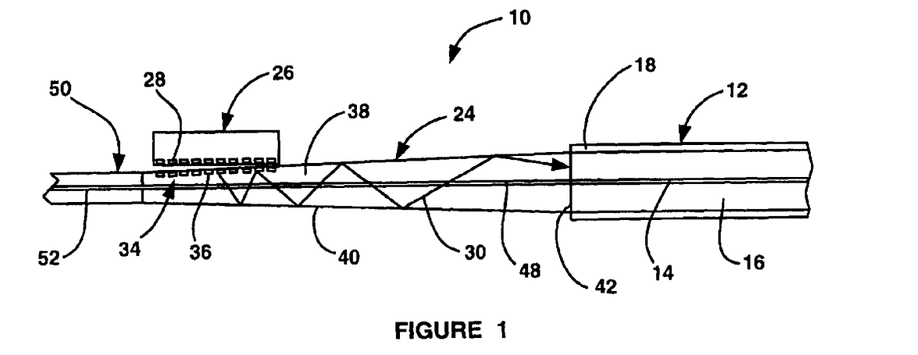
FIG. 1 is a plan view of an optical pump light system for coupling pump light into a signal fiber of a fiber array laser/amplifier, according to an embodiment of the present invention.

FIG. 1 is a plan view of an optical pump light system 10 that provides pump light to a fiber array laser/amplifier, such as a high power dual-clad fiber array laser/amplifier. The system 10 includes a dual-clad signal fiber 12 that is intended to represent one of many signal fibers in a fiber array of the type discussed above. The dual-clad signal fiber 12 includes a single-mode core 14 through which the optical signal being amplified propagates.

An inner cladding layer 16 is formed around the core 14 and an outer cladding layer 18 is formed around the inner cladding layer 16. The core 14 and the cladding layers 16 and 18 are made of a suitable fiber material, such as silica, and are doped to provide the appropriate index of refraction. Particularly, in order to contain the signal light within the core 14, the inner cladding layer 16 has a lower index of refraction than the core 14. Likewise, in order to allow pump light to propagate across the core 14 and to contain the pump light within the inner cladding layer 16, the outer cladding layer 18 has a lower index of refraction than the inner cladding layer 16.

The fiber 12 would include other outer jacket layers or buffers, not specifically shown, having the appropriate index of refraction to provide fiber protection. The transition between the inner cladding layer 16 and the outer cladding layer 18 defines a numerical aperture (NA) that identifies the angle of incidence that will allow the pump light to propagate into the signal fiber 12, as will be discussed in more detail below. The diameter of the core 14 is limited (5–20 µm) so that only a single optical mode propagates therethrough. The core 14 is also doped with suitable rare-earth ions, such as ytterbium and erbium, that are excited by the pump light so that the signal is amplified within the core 14, as is well understood by those skilled in the art.

According to the invention, a tapered light guide (TLG) 24 and a diode bar 26 including a plurality of diode emitters 28 couple optical pump light 30 into the signal fiber 12. The diode bar 26 is positioned proximate an aperture 34 at an end of the TLG 24 opposite to the fiber 12, as shown. In one embodiment, the plurality of diode emitters 28 is a one-dimensional array of diode emitters. The diode bar 26 may include 50–100 of the diode emitters 28, each generating 1–2 watts of power. However, this is a non-limiting example.

The aperture 34 includes an array of diffraction gratings 36, where a diffraction grating 36 is positioned relative to each diode emitter 28, as shown. As will be discussed in more detail below, the diffraction gratings 36 include grating lines (FIG. 4) that allow the pump light 30 generated by the diode emitters 28 to enter the TLG 24 at a predetermined diffraction angle. The diffraction grating 36 can be any suitable grating for the purposes described herein that allows the pump light 30 to propagate into the TLG 24.

The discussion herein and the related figures show the diode emitters 28 being uniformly spaced along the TLG 24. However, this is for illustration purposes only in that the diode emitters 28 and the diffraction gratings 36 do not need to be symmetrically positioned along the TLG 24. It is desirable that a grating 36 align with each diode emitter 28, but this configuration does not need to be uniform along the TLG 24. Further, the various diode emitters 28 can provide different powers, have different wavelengths, etc. within the scope of the present invention.

The TLG 24 is tapered, i.e., its diameter widens, towards the signal fiber 12. This tapering allows the angle of reflection, as measured from the pump light 30 to the transition between the TLG 24 and air, shown herein as interface 40, to decrease as it propagates, as will be discussed in more detail below. By removing outer buffer layers from the TLG 24 to expose a pump light propagation region 38 of the TLG 24 to the air, a greater NA is provided at the fiber-to-air interface 40 that would otherwise not be possible with an outer buffer layer around the TLG 24. TIR at the interface 40 proximate the diode bar 26 is thus allowed where the angle of the pump light 30 with the interface 40 is the greatest. For example, the NA is approximately 1 for fused silica glass having a refractive index value near 1.46 relative to air. Glass fibers with outer cladding or buffer layers typically have an NA near 0.3, while some special fiber designs approach an NA of 0.4. Therefore, a 2.5–3 times greater NA for the fiber-to-air interface 40 substantially increases the acceptable range of angles for the pump light 30 to propagate along the TLG 24.

Because the tapering of the TLG 24 decreases or reduces the ray angle of the pump light 30 at each reflection off of the interface 40, the tapering of the TLG 24 can be designed to match the NA of the signal fiber 12 at a TLG/fiber interface 42 set by the inner cladding layer 16 and the outer cladding layer 18 of the fiber 12. Furthermore, the TLG fiber diameter at the interface 42 is made to be equal to or less than the diameter of the inner cladding 16. This allows the pump light 30 to be contained within the fiber 12 when it crosses the TLG/fiber interface 42. This NA reduction and matching achieved by the TLG 24 provides efficient coupling of the pump light 30 into the fiber 12 to provide light amplification.

According to the invention, the TLG 24 includes a single-mode core 48 extending through the pump light propagation region 38. The core 48 is optically coupled to the core 14 of the fiber 12 by any suitable optically coupling technique, such as optical fusing, so that signal light amplified in the fiber 12 propagates into the core 48 with minimal reflection and loss. Thus, the pump light 30 and the signal beam propagate in opposite directions in the TLG 24 and the fiber 12. The pump light propagation region 38 and the core 48 are made of a suitable fiber material, such as silica, and the propagation region 38 has a lower index of refraction than the core 48, so that the signal light is contained in the core 48 by TIR. The core 48 is not doped with rare earth ions, so no signal amplification occurs in the core 48. However, in alternate embodiments, the core 48 may be doped with rare earth ions to provide signal amplification.

An output fiber 50 is optically coupled to the end of the TLG 24 proximate the diode bar 26 and opposite to the signal fiber 12. The output fiber 50 includes a single-mode core 52 that is optically fused to the core 48 in a manner that would provide minimal reflections and losses. Therefore, the optical signal amplified in the fiber 12 by the pump light 30 propagates through the TLG 24 and into the output fiber 50 as an amplified high-power optical beam to be directed towards the target.

Figure 2:
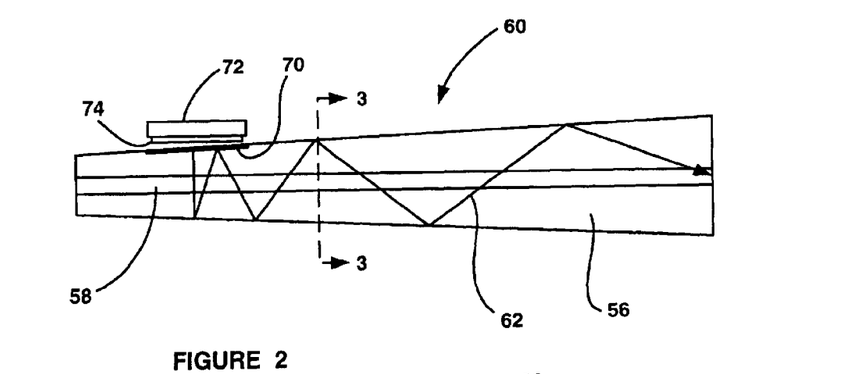
FIG. 2 is a plan view of a tapered light guide employed in the optical system shown in FIG. 1 depicting the ray pattern of the pump light.
Figure 3:
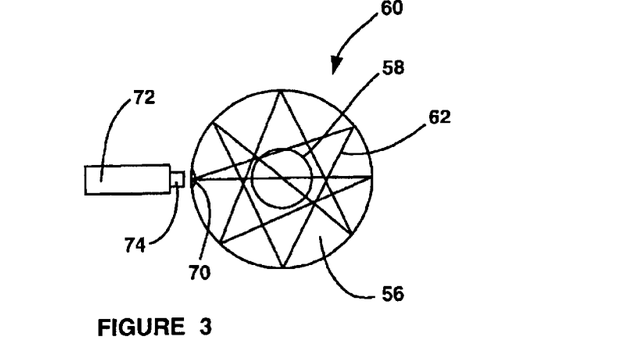
FIG. 3 is a cross-sectional view through line 3—3 in FIG. 2 of the tapered light guide.

FIG. 2 is a side view of a TLG 60 including a pump light propagation portion 56 and a core 58. The TLG 60 shows pump light 62 propagating through the TLG 60 to illustrate the requirements of the tapering of the TLG applicable to be used in the system 10 of the invention. FIG. 3 is a cross-sectional view of the TLG 60 through line 3—3. FIG. 2 shows the slow axis plane of the pump light 62 and FIG. 3 shows the fast axis plane of the pump light 62. The taper angle $\alpha$ of the TLG 60 is $\alpha=(d_2-d_1)/L$, where $d_1$ is the diameter of the TLG 60 at end 64, $d_2$ is the diameter of the TLG 60 at end 66 and L is the length of the TLG 60. In one embodiment, $d_1=0.05$, $d_2=0.2$ and L=20 mm for a signal fiber having a numerical aperture of 0.2–0.4.

The pump light 62 enters the TLG 60 through an aperture 70 positioned relative to a diode bar 72 including diode emitters 74. In this example, the aperture 70 is just an opening in the TLG 60 and does not include diffraction gratings. Thus the pump light 62 is directed straight across the TLG 60 from the aperture 70. The taper angle $\alpha$ causes the pump light 62 to be directed at a minor angle from the first reflection off of the interface 40. It typically takes about 80–100 reflections off of the interface 40 to generate the appropriate angle of the pump light 62. For those designs that include a diffraction grating, the number of reflections to achieve TIR in the signal fiber 12 is lessened because the pump light 62 hits the interface 40 at the first reflection with some significant angle.

Figure 4:
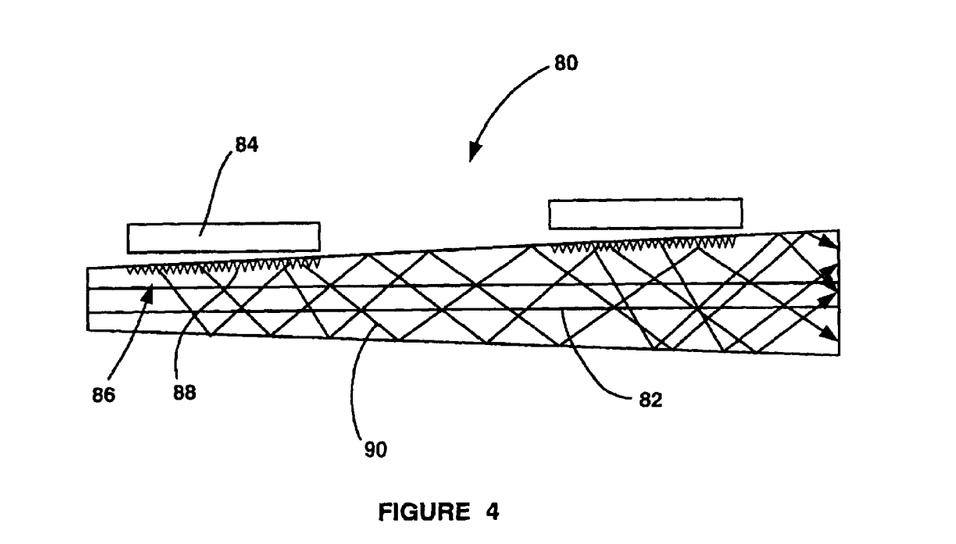
FIG. 4 is a plan view of a section of the tapered light guide of the optical system shown in FIG. 1.

FIG. 4 is a plan view of a section of a TLG 80 including a single-mode core 82. This section of the TLG 80 is a minor section ($\cong 100$ $\mu$m) of the complete TLG 80 proximate the diode bar, where only two of the many diode emitters 84 of the diode bar are shown adjacent to each other. The TLG 80 includes an array of diffraction gratings 86, each including transmission grating lines 88, provided in the TLG 80 opposite the diode emitters 84 so that optical pump light 90 emitted from the emitters 84 are diffracted into the TLG 80, as shown. The grating lines 88 are on the order of the wavelength of the pump light 90, i.e., about 1 $\mu$m. This figure is intended to show that some of the pump light 90 emitted from an emitter 84 upstream from subsequent emitters 84 impinges the diffraction grating 86 of those subsequent emitters 84. However, the width of the gratings 86 can be made very narrow, on the order of 1 $\mu$m, to limit the amount of the pump light 90 that actually leaks out through the grating 86 of the subsequent emitters 84. Therefore, only a small fraction, such as less than 1%, of the pump light 90 that is propagating down the TLG 80 leaks out of the successive gratings 86 because their combined area is much smaller than the surface area of the TLG 80.

Figure 5:
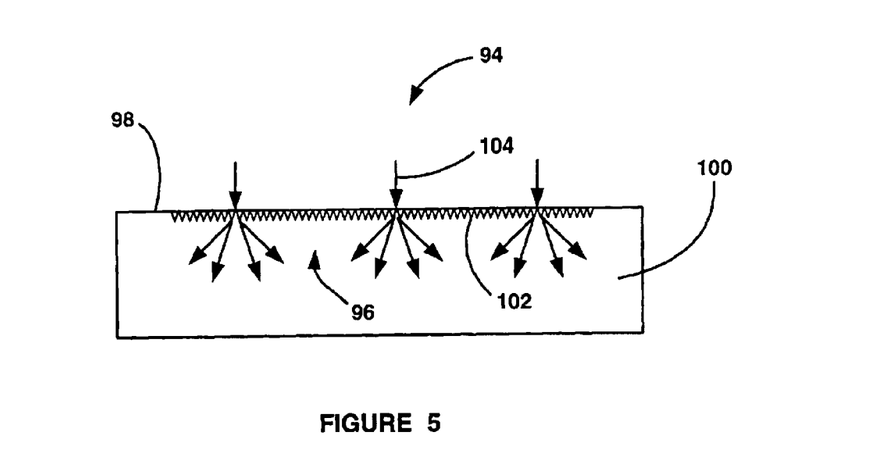
FIG. 5 is a plan view of a holographic transmission grating suitable for the optical system of the invention.

FIG. 5 is a plan view of an optical diffraction device 94 including a transmission grating 96, such as a holographic or symmetric transmission diffraction grating, patterned in a top surface 98 of a silica block 100. The transmission grating 96 includes a plurality of grating lines 102 that diffract a light beam 104 impinging the top surface 98 of the block 100. As is apparent, the diffraction of the light beam 104 caused by the diffraction grating 96 disperses the light beam 104 in opposing directions within the block 100. This type of light dispersion is accomplished by making the grating lines 102 symmetric, such as angled equally in both directions.

Figure 6:
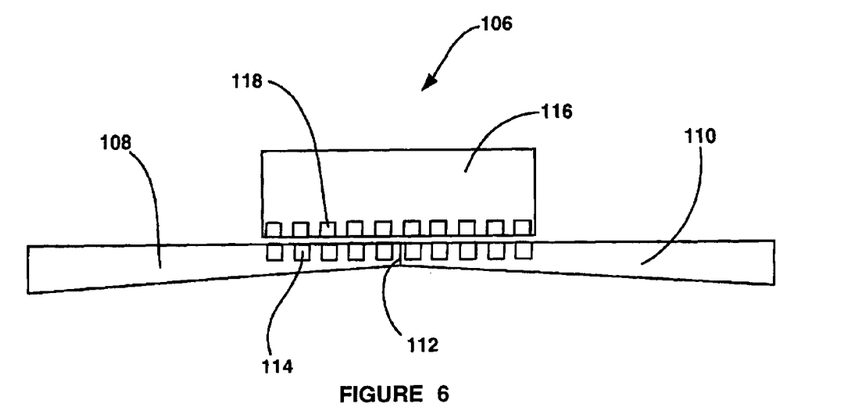
FIG. 6 is a plan view of an optical pump light system, according to the invention, employing the holographic transmission grating shown in FIG. 5.

FIG. 6 is a plan view of an optical pump light system 106 for a fiber array laser/amplifier that makes use of the device 94, discussed above. The optical system 106 includes a first TLG 108 and a second TLG 110 optically fused together at an interface 112. The TLGs 108 and 110 are tapered such that the interface 112 is the narrowest part of the diameter of the TLGs 108 and 110, as shown. An array of spaced apart diffraction gratings 114 are provided in both the TLGs 108 and 110, where each diffraction grating 114 is a transmission grating of the type discussed above with reference to FIG. 5.

A diode bar 116 including a plurality of diode emitters 118 is positioned relative to the TLGs 108 and 110 so that an emitter 118 aligns with each diffraction grating 114. Pump light from the emitters 118 is diffracted by the diffraction gratings 114 in opposing directions so that pump light propagates in opposite directions relative to the interface 112. The tapering of the TLGs 108 and 110 provides the reduction in the reflection angle of the pump light so that a signal fiber (not shown) of the type discussed above coupled to an end of each of the TLGs 108 and 110 opposite to the interface 112 would receive the pump light. Thus, the optical system 106 can provide pump light over a longer length of the signal fiber in certain designs. The core is not shown in this embodiment only for clarity purposes.

Figure 7:
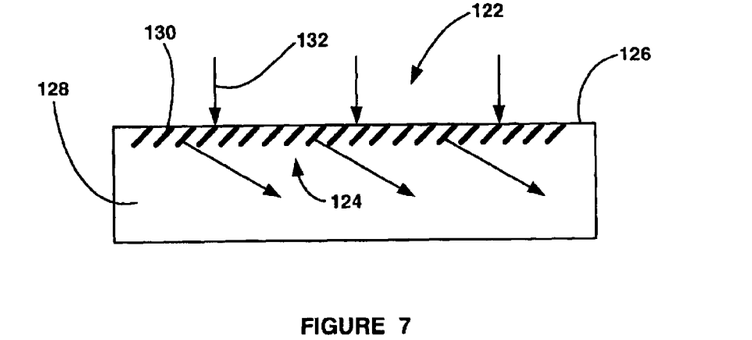
FIG. 7 is a plan view of a blazed transmission grating suitable for the optical system of the invention.

FIG. 7 is a plan view of an optical diffraction device 122 similar to the optical diffraction device 94 where a blazed transmission grating 124 is patterned in a top surface 126 of a silica block 128. Because the transmission grating 124 is a blazed grating, it has angled grating lines 130 that diffract light in a single direction. Therefore, a light beam 132 that impinges the top surface 126 is diffracted in one direction.

Figure 8:
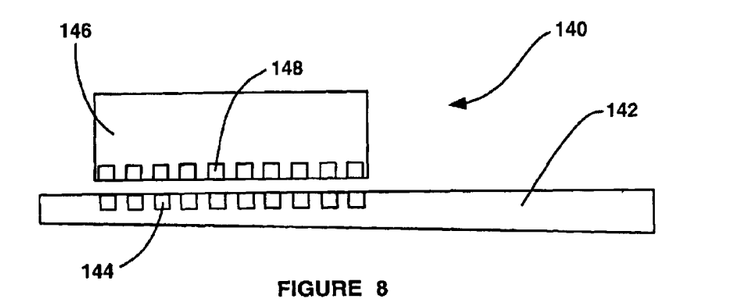
FIG. 8 is a plan view of an optical pump light system, according to the invention, employing the blazed transmission grating shown in FIG. 7.

FIG. 8 is a plan view of an optical pump light system 140, similar to the optical pump light system 106 that includes a single TLG 142. An array of spaced apart diffraction gratings 144 are provide in the TLG 142, as shown, where each diffraction grating 114 is a blazed grating of the type discussed above with reference to FIG. 7. A diode bar 146 including a plurality of diode emitters 148 is provided proximate the transmission gratings 144 so that a diode emitter 148 aligns with each grating 144, as shown. Pump light from the diode emitters 148 is directed into the TLG 142 by the transmission gratings 144 so that the pump light is directed towards the expanding end of the TLG 142, as discussed above.

Figure 9:
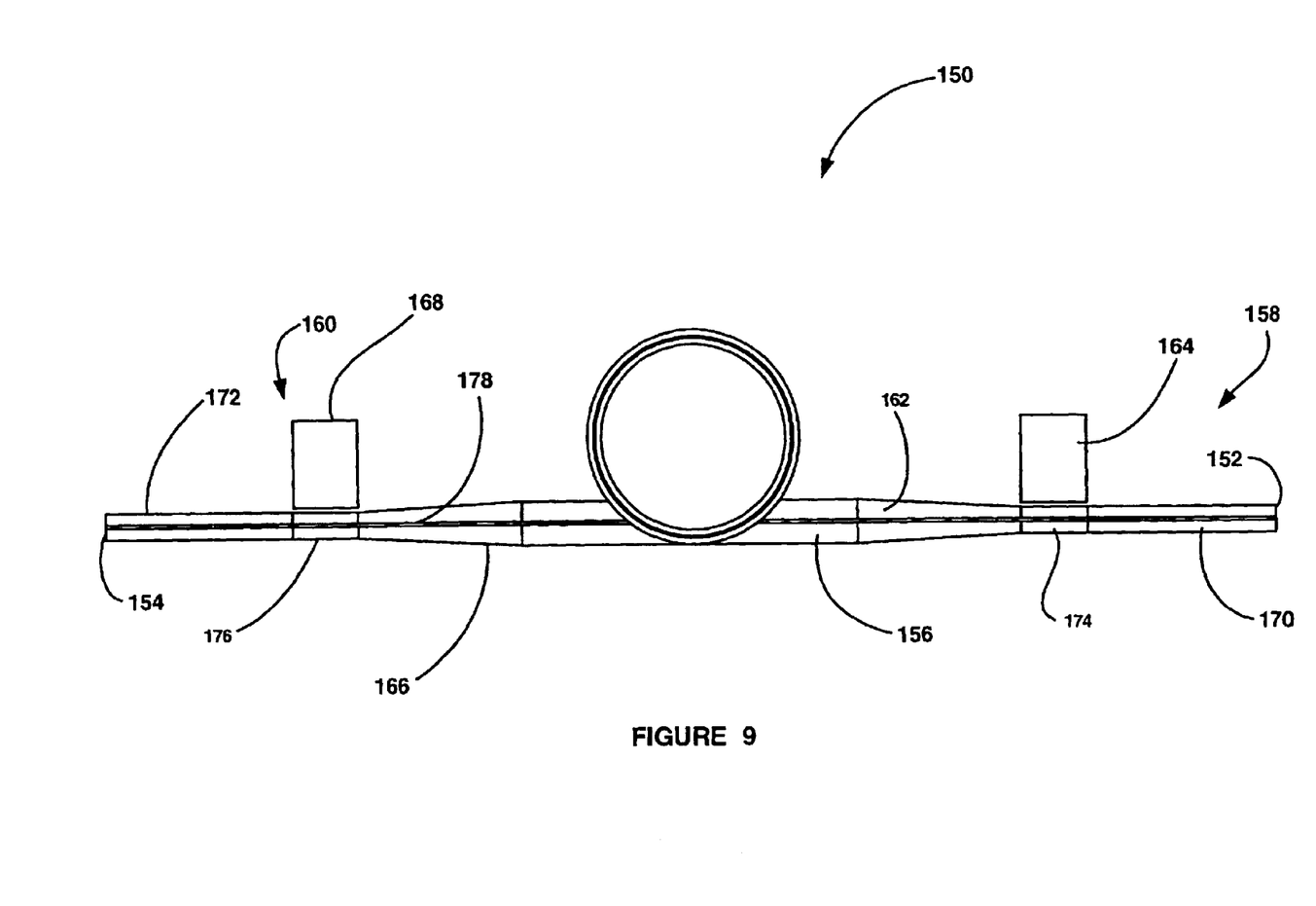
FIG. 9 is an end-pumped fiber array laser/amplifier employing an optical pump light system at both ends of the amplifier, according to an embodiment of the present invention.

FIG. 9 is a plan view of an end-pumped fiber array laser/amplifier 150, according to an embodiment of the present invention. The signal light to be amplified is introduced into the amplifier 150 at one end 152 and amplified light is output at an opposite end 154. A length of a polarization maintaining (PM) dual-clad signal fiber 156 is coupled to a pump source 158 at the end 152 of the amplifier 150 and is coupled to a pump source 160 at the end 154 of the amplifier 150. The pump source 158 includes a TLG 162 and a diode bar 164 and the pump source 160 includes a TLG 166 and a diode bar 168 that provides the pump light in the manner discussed above. An input single-mode PM fiber 170 is optically coupled to the pump source 158 opposite to the fiber 156, and an output single-mode PM fiber 172 is optically coupled to the pump source 160 opposite to the fiber 156, as shown.

In the embodiment shown in FIG. 9, the pump light from the diode bar 164 is directed into a coupling fiber 174 spliced between the TLG 162 and the input fiber 170, and the pump light from the diode bar 168 is directed into a coupling fiber 176 spliced between the TLG 166 and the output fiber 172. This shows that the pump light does not necessarily have to be directed into the TLGs, but can be coupled into the TLGs by another fiber, where the angle of reflection is then reduced.

A continuous strand of a single-mode fiber core 178 extends from the input fiber 170, through the coupling fiber 174, through the TLG 162 of the pump source 158, through the amplifying fiber 156, through the TLG 166 of the pump source 160, through the coupling fiber 176 and then through the output fiber 172. Therefore, as the signal light propagates through the amplifier 150, it is amplified by pump light provided at both ends of the amplifying fiber 156.

Figure 10:
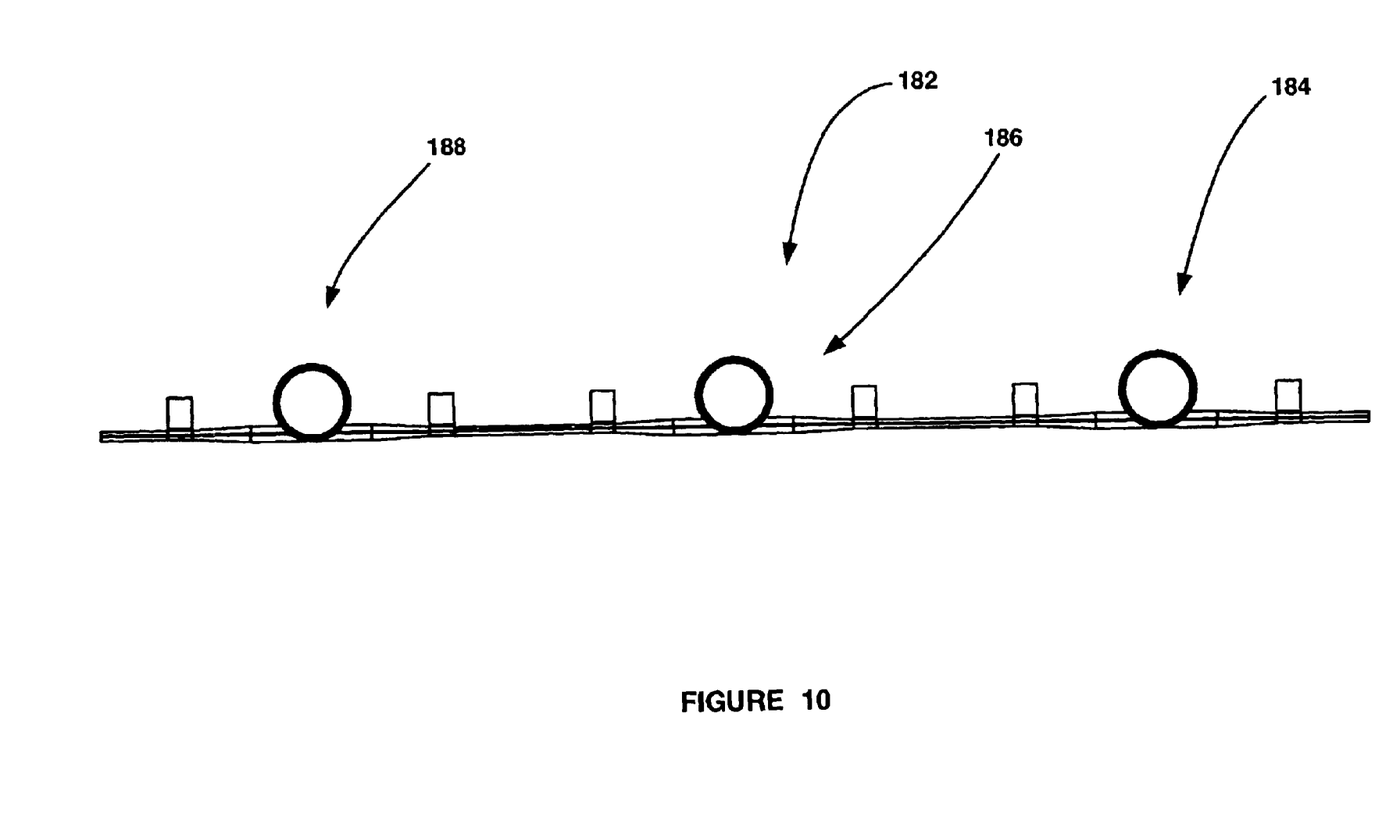
FIG. 10 is a distributed fiber array laser/amplifier employing a plurality of distributed optical pump light systems, according to another embodiment of the present invention.

FIG. 10 is a plan view of a distributed fiber array laser/amplifier 182 that includes a series of three amplifier sections 184, 186 and 188, where each section 184, 186 and 188 is a complete amplifier 150 of the type shown in FIG. 9. This embodiment illustrates that any appropriate number of the amplifiers 150 can be distributed along the signal fiber to get the desired amount of signal amplification.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An optical system for providing pump light to amplify an optical signal beam, said system comprising:

a tapered light guide including a first end and a second end where the first end has a narrower diameter than the second end and the tapered light guide gradually expands from the first end to the second end, said tapered light guide including a single-mode core and an aperture proximate the first end;

a dual-clad amplifier fiber coupled to the second end of the tapered light guide, said amplifier fiber including a single-mode core, an inner cladding layer surrounding the single-mode core and an outer cladding layer surrounding the inner cladding layer, wherein the single-mode core of the amplifier fiber is optically coupled to the single-mode core of the tapered light guide; and a plurality of light emitters positioned proximate the aperture in the tapered light guide, said plurality of light emitters directing pump light through the aperture into the tapered light guide, wherein the pump light is reflected off of an outer surface of the tapered light guide and is directed towards the second end, and wherein the gradual increase in the diameter of the tapered light guide causes the angle of reflections of the pump light to be reduced so that the pump light is coupled into the dual-clad fiber and is contained therein by total internal reflection to amplify the signal beam in the single-mode core.

2. The system according to claim 1 wherein the tapered light guide is surrounded by air so that the relative indexes of refraction between the air and the tapered light guide is great enough to provide total internal reflection of the pump light at the first end of the tapered light guide.

3. The system according to claim 1 wherein the plurality of emitters is a plurality of diode emitters provided in a diode bar.

4. The system according to claim 3 wherein the diode bar includes up to 100 emitters.

5. The system according to claim 3 wherein the diode bar includes a one-dimensional array of diode emitters.

6. The system according to claim 1 further comprising an output fiber optically coupled to the first end of the tapered light guide, said output fiber including a single-mode core optically coupled to the single-mode core of the tapered light guide so that the amplified optical signal is directed out of the tapered light guide and into the output fiber.

7. The system according to claim 1 wherein the aperture includes a transmission grating for diffracting the pump light.

8. The system according to claim 7 wherein the transmission grating includes an array of gratings where a separate grating aligns with each emitter.

9. The system according to claim 7 wherein the transmission grating is selected from the group consisting of holographic transmission gratings and blazed transmission gratings.

10. The system according to claim 1 wherein the aperture is within the range of 1 to several $\mu$m wide.

11. The system according to claim 1 wherein the system is part of a dual-clad fiber array laser/amplifier.

12. An optical system comprising:

a tapered light guide including a first end and a second end where the first end has a narrower diameter than the second end and the tapered light guide gradually expands from the first end to the second end, said tapered light guide including a single-mode core, said light guide being responsive to pump light; and a signal fiber coupled to the second end of the tapered light guide, said signal fiber including a single-mode core, wherein the single-mode core of the signal fiber is optically coupled to the single-mode core of the tapered light guide, wherein the pump light is reflected off of an outer surface of the tapered light guide by total internal reflection and is directed towards the second end, and wherein the gradual increase in the diameter of the tapered light guide causes the angle of reflections of the pump light to be reduced so that the pump light is coupled into the signal fiber and is contained therein to amplify the signal beam in the single-mode core.

13. The system according to claim 12 wherein the tapered light guide is surrounded by air so that the relative indexes of refraction between air and the tapered light guide is great enough to provide the total internal reflection of the pump light at the first end of the tapered light guide.

14. The system according to claim 13 wherein the system is a high power dual-clad fiber array laser/amplifier.

15. The system according to claim 12 further comprising a pump light source optically coupled to the tapered light guide, said pump light source providing the pump light.

16. The system according to claim 15 wherein the tapered light guide includes a transmission aperture proximate the first end of the tapered light guide, said pump light source being positioned proximate the transmission aperture to allow the pump light to be directed into the tapered light guide through the aperture.

17. The system according to claim 16 wherein the transmission aperture includes at least one diffraction grating.

18. The system according to claim 15 further comprising a coupling fiber coupled to the first end of the tapered light guide, said pump light source being positioned adjacent to the coupling fiber, wherein pump light coupled into the coupling fiber is coupled into the tapered light guide.

19. The system according to claim 15 wherein the pump light source is a diode bar including a plurality of diode emitters.

20. An optical system for amplifying an optical signal beam, said system comprising:
 a tapered light guide including a first end and a second end where the first end has a narrower diameter than the second end and the tapered light guide gradually expands from the first end to the second end, said tapered light guide including a single-mode core and an aperture proximate the first end, said aperture including an array of transmission gratings;
 a signal fiber coupled to the second end of the tapered light guide, said signal fiber including a single-mode core, wherein the single-mode core of the signal fiber is optically coupled to the single-mode core of the tapered light guide; and
 a plurality of light emitters positioned proximate the aperture in the tapered light guide where each emitter aligns with a transmission grating in the array, said plurality of light emitters directing pump light through the transmission gratings into the tapered light guide, wherein the pump light is reflected off of an outer surface of the tapered light guide and is directed towards the second end, and wherein the gradual increase in the diameter of the tapered light guide causes the angle of reflections of the pump light to be reduced so that the pump light is coupled into the signal fiber and is contained therein to amplify the signal beam in the single-mode core.

21. The system according to claim 20 wherein the tapered light guide is surrounded by air so that the relative indexes of refraction between air and the tapered light guide is great enough to provide the total internal reflections of the pump light at the first end of the tapered light guide.

22. The system according to claim 20 wherein the transmission gratings are selected from the group consisting of holographic transmission gratings and blazed transmission gratings.

23. The system according to claim 20 wherein the plurality of emitters is a plurality of diode emitters provided in a diode bar.

24. The system according to claim 23 wherein the diode bar includes a one-dimensional array of diode emitters.

25. The system according to claim 20 wherein the aperture is within the range of 1 to several $\mu$m wide.

26. An optical system comprising:
 a tapered light guide including a first end, a second end and a middle portion, where the middle portion has a narrower diameter than the diameter of the first end and the second end and where the tapered light guide gradually expands from the middle portion to the first end and from the middle portion to the second end, said tapered light guide including a single-mode core extending therethrough and a transmission grating array proximate the middle portion, said transmission grating array including a plurality of symmetric gratings; and
 a plurality of light emitters positioned proximate the transmission grating array in the tapered light guide, said plurality of light emitters directing pump light through the grating array into the tapered light guide, wherein the pump light is reflected off of an outer surface of the tapered light guide and is directed towards the first and the second ends, and wherein the gradual increase in the diameter of the tapered light guide causes the angle of reflections of the pump light to be reduced.

27. The system according to claim 26 wherein a separate transmission grating aligns with each light emitter.

28. The system according to claim 26 wherein the plurality of light emitters include up to 100 diode emitters that are part of a diode bar.

29. The system according to claim 26 wherein the tapered light guide is surrounded by air so that the relative indexes of refraction between air and the tapered light guide is great enough to provide the total internal reflection of the pump light at the middle portion of the tapered light guide.

* * * * *